Patented May 24, 1938

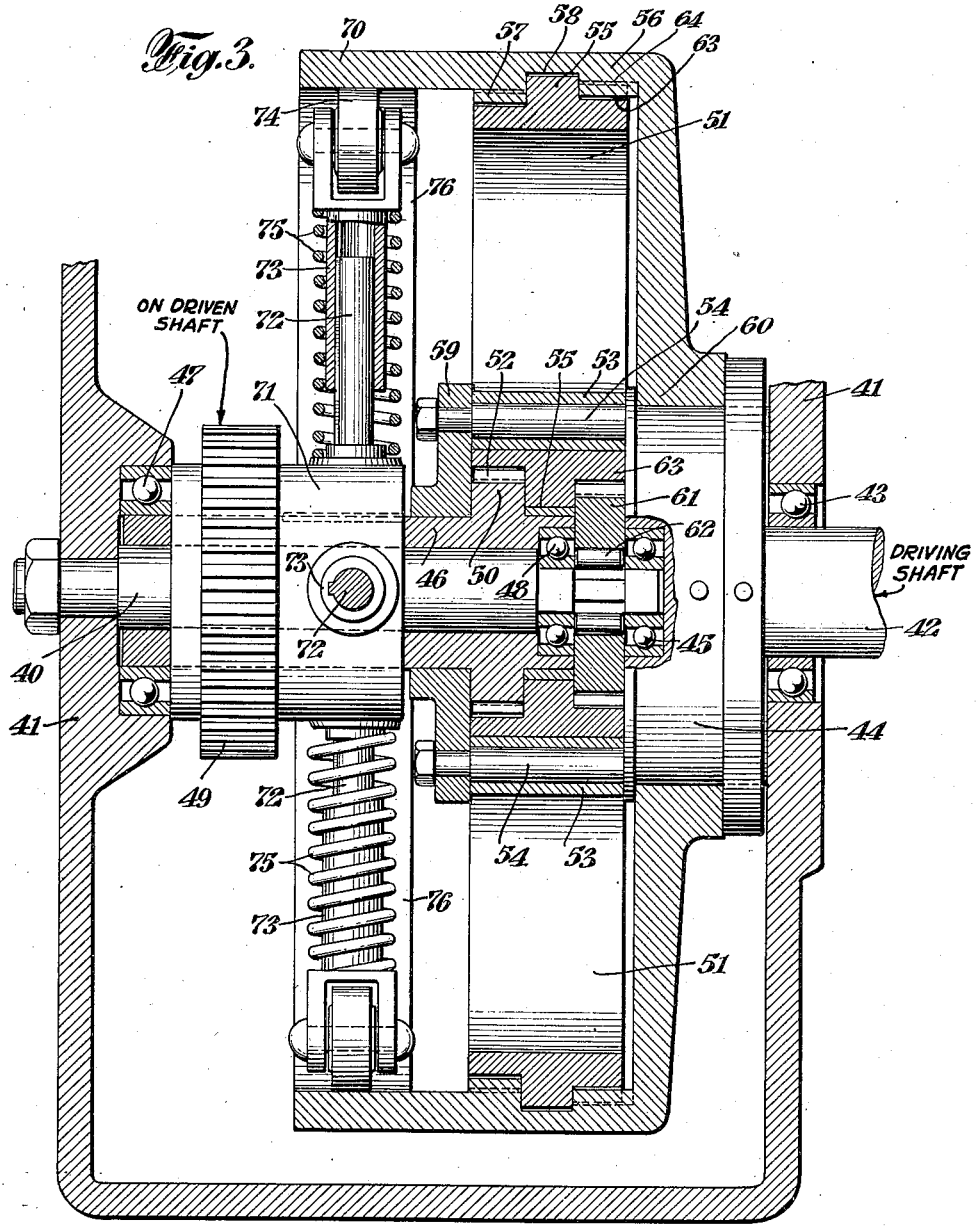

2,118,423

UNITED STATES PATENT OFFICE 2,118,423

VARIABLE SPEED GEAR WITH CENTRIFUGAL CONTROL

August Timmermann, New York, N. Y.

Application March 15, 1937, Serial No. 130,871

8 Claims. (Cl. 74—260)

My invention relates to variable speed gears and especially to such gears in which the variation of the speed is brought about by the action of centrifugal force. In particular it relates to a type of variable speed planetary gear drive of the type disclosed in my U. S. Patent No. 2,076,926, the general arrangement and operation of the planetary gear per se being in substance similar to that shown in my aforementioned application.

My invention is illustrated in the accompanying drawings, in which—

Fig. 3 represents a longitudinal sectional elevation of a modification of the gear shown in Figs. 1 and 2.

Figure 1:
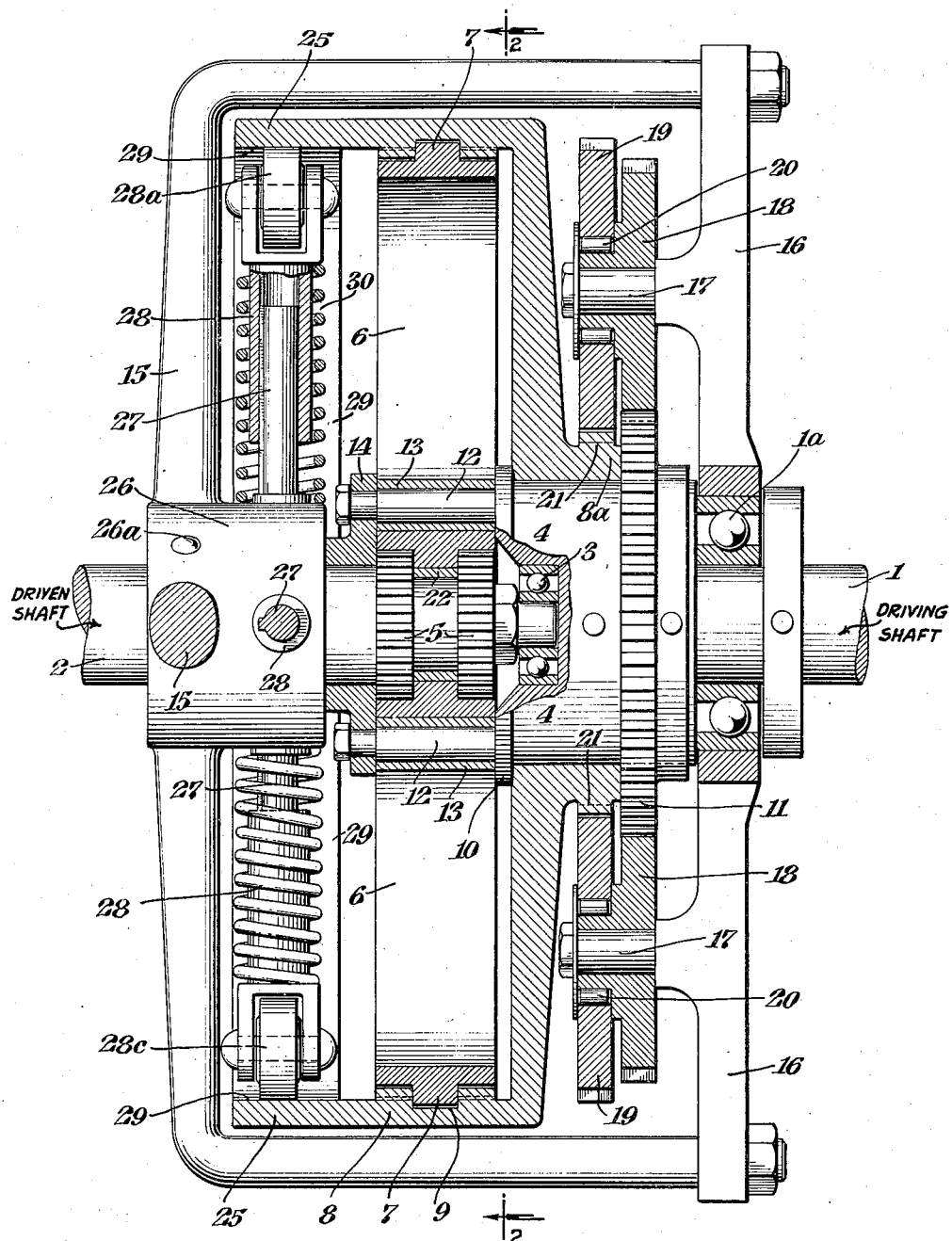
Fig. 1 represents a longitudinal sectional elevation of the gear.
Figure 2:
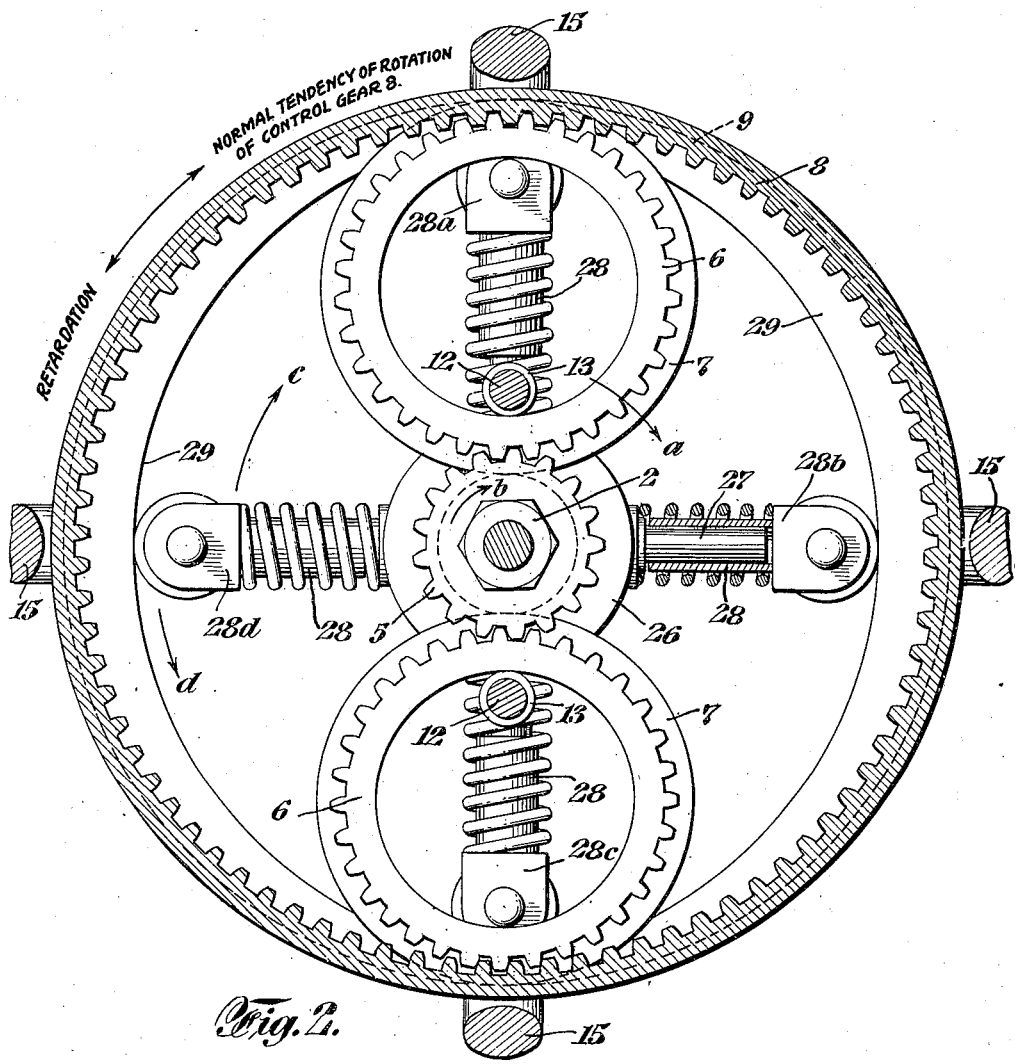
Fig. 2 represents a transverse section therethrough on the line 2—2 in Fig. 1.

Referring to Fig. 1, 1 represents the drive shaft and 2 the driven shaft coaxially arranged with the drive shaft and having its end journalled in the latter, as shown at 3. On the inner end of drive shaft 1 is fixed a drive cylinder 4, in the end of which the aforementioned bearing 3 is housed. At the inner end of driven shaft 2 are fixed two pinions 5 spaced apart a suitable distance, as shown, which pinions represent the sun wheel of the planetary gear. Around these sun wheels are disposed the planetary gears 6, in this case two, arranged diametrically opposite each other, as shown in Fig. 2. These planetary gears are of the annular or ringed type, similar to the planetary ring gears shown and described in my aforementioned patent. These ring gears each have a central circumferential bead 7 of a width so as to engage between the two sun wheel pinions 5, these beads resting upon a pressure ring 22 mounted on driven shaft 2, whereby the proper depth of mesh is maintained between the planetary rings 6 and the sun wheel pinions 5. Planetary rings 6 are surrounded by an inside geared control wheel 8 which meshes its gear teeth with the two planetary rings and which has a peripheral groove 9 in which the beads 7 of the planetary rings engage, so that thereby the rings are held in place in axial direction. Control gear 8 is rotatably mounted on drive cylinder 4 and held in place at one end by a bead 10 provided at the end of drive cylinder 4 and at the other end by a gear wheel 11 fixed on drive shaft 1. Drive cylinder 4 is provided with two diametrically opposite disposed studs 12 which extend through the ring gear 6 and each of which carries a roller 13 which rolls on the inner periphery of its appertaining ring gear 6. The point at which rollers 13 engage the respective planetary rings is chosen so that it is located outside of the pitch circle of sun wheel pinions 5, with the result that when drive cylinder 4 is rotated by the drive shaft 1, planetary rings are forced to roll around sun wheel pinions 5. Studs 12 are held at their free ends by a hub 14 freely rotatable on driven shaft 2.

With an arrangement so far described, it will be noted that control gear 8 would run in the same direction as drive shaft 1 but at a higher speed, depending upon the gear ratios between sun wheel pinions 5 and planetary rings 6, assuming for the moment that the driven shaft 2 is stationary.

For the purpose of this invention, some means must be provided by which control gear 8 is positively retarded so that it would not run at a speed too far in excess of drive shaft 1 and at a speed at which the driven shaft 2 would rotate very slowly, it being assumed that this slow speed of the driven shaft 2 is the minimum speed at which it should rotate at a given speed of drive shaft 1. These aforementioned retarding means are as follows. On driven shaft 2 is fixed a spider 15 which extends with its arms around control gear 8 and has its arms connected by a bridge 16 on which are mounted two diametrically opposite disposed studs 17 which extend toward control gear 8 and each of which carries a gear 18 in mesh with the aforementioned gear 11 fixed on drive shaft 1. Each gear wheel 18 carries a jack gear 19 mounted by way of an overrunning clutch 20 which is directed so that gear 19 can freely rotate in a direction opposite to that in which its appertaining gear 18 rotates, but that jack gear 19 is locked on gear 18 when it tends to rotate in the same direction as this gear, faster than the latter.

Each of jack gears 19 is geared at 21 to the hub 8a of control gear 8. The gear ratio between gears 11, 18, 19 and 21 is chosen so that the control gear 8 will run at a speed somewhat greater than drive shaft 1. It is prevented however, to run at a speed as high as that at which planetary rings 6 would tend to take it along, on account of the aforementioned overrunning clutches 20 on which jack gears 19 are mounted. By this arrangement the result is brought about that the driven shaft 2 runs slowly at a certain desired speed in the direction of drive shaft 1. If control gear 8 were retarded further by some suitable means, which retardation the overrunning clutches 20 would allow, the driven shaft 2 would start running faster, commensurate with the extent to which control gear 8 is further retarded.

This retardation of control gear 8 is brought about in the following manner. Control gear 8 extends axially to the left in Fig. 1 as shown at 25, into the plane of hub 26 of spider 15. This hub, as shown more clearly in Fig. 2, carries four radially extending studs 27 on each of which a heavy ferrule 28 is splined, each of which ferrules carries a cam roller. These cam rollers are indicated by 28a, 28b, 28c and 28d. The inner periphery of control gear extension 25 is in the shape of an oval cam 29 which is more clearly shown in Fig. 2, from which it will be noted that the high points of this cam are located at the left and right side of Fig. 2 and the low points are at the top and bottom of this figure. Each of ferrules 28 carries a compression spring 30 which bears at one end against hub 26 and at its other end against the head of the ferrule which carries the cam roller, so that by this arrangement the cam rollers 28a—28d are always held in contact with the cam surface 29 with just enough pressure to prevent the ferrules from unduly slapping on their studs. Ferrules 28 and cam rollers 28a through 28d are sufficiently heavily constructed so as to be of substantial weight. So long as the driven shaft rotates slowly, i. e., at its lowest intended speed, the centrifugal force exerted by cam rollers 28a through 28d against the cam surface 29 is not enough to greatly retard the rotation of control gear 28. As soon as drive shaft 1 is slightly speeded up, the pressure, due to the increased centrifugal force, exerted by the cam rollers against cam surface 29 is sufficient to retard the speed of control gear 8 by producing a reactive force in a direction opposite to the normal revolution direction of gear 8. This is more clearly illustrated in Fig. 2 in which the direction of rotation of the drive shaft is indicated by the arrow a, the direction of the driven shaft by the arrow b, and the direction of the roller studs 27 by the arrow c. The normal tendency of rotation of control gear 8 is indicated at the right-hand end of the double-headed arrow and is so labeled in Fig. 2. As we have seen before, control gear 8 tends to rotate faster than drive shaft 1 in the same direction as the drive shaft. It therefore would run ahead of the roller studs 27 which run at the speed of the driven shaft 2 in the same direction, so that a relative speed exists between these roller studs and control gear 8, which results in a direction of motion of the cam rollers relatively to gear 8, indicated by the arrow d in Fig. 2. Thus, for instance, cam roller 28a would in that case move to the left with respect to cam surface 29 and thereby move toward the high point of the cam which is located at the left-hand center of Fig. 2. Cam roller 28c would likewise move toward the high point of the cam surface 29 which is located at the right-hand center of Fig. 2, while cams 28b and 28d both move toward the low points of cam surface 29. The pressure exerted by the cam rollers against the cam surface 29, due to the centrifugal force at higher speeds of driven shaft 2, is sufficient to produce enough torque on control gear 8 in the direction of retardation, indicated at the lower end of the double-headed arrow in Fig. 2, to further retard control gear 8. Any torque in the forward direction which might be produced by the cam rollers which run toward the low points of the cam surface 29 is neutralized by the locking action of the overrunning clutch, which never allows the control gear by itself to run ahead beyond the speed set by the momentary prevailing speed conditions. The result is that control gear 8 is slightly retarded and the speed of the driven shaft is increased until the system returns into a balanced condition at the new speed. As the speed of the driven shaft is increased, thereby the pressure, due to centrifugal force, increases further, and thus the relative speed between control gear 8 and the cam rollers decreases with the result that the retardation of control gear 8 is increased until it rotates finally at the speed of the drive shaft, and thereby the entire gear system rotates as a unit, the driven shaft 2 rotating at the same speed as the drive shaft. By properly designing the weight of the cam rollers and the height of the cam high points, the centrifugal force exerted by the cam rollers against the cam surface becomes so great that the cam rollers cannot reach the high points of the cam surface at or beyond a given speed of the driven shaft, and from that point on, the speed of the driven shaft increases and decreases directly with that of the drive shaft. As soon as the speed of the drive shaft drops below that at which the pressure exerted by the centrifugal force is unable to hold the rollers stationary with respect to cam surface 29, the rollers again commence to roll over the cam surface, the control gear 8 again increases its speed over that of the drive shaft 1 and consequently the speed of the driven shaft decreases.

It will be noted from Fig. 2 that by the arrangement of the four cam rollers and two high points and two low points on the cam surface 29, the retarding action of the cam rollers upon control gear 8 is continuous, that is to say, as soon as for instance cam rollers 28b and 28d run off the high point, which would leave for the moment the control gear uncontrolled, the cam rollers 28a and 28c commence to roll up on the cam surface 29 and thus immediately take over the control of control gear 8. By this arrangement, a steady torque in the retardation direction is exerted upon control gear 8, whatever the amount of this torque may be for the moment.

The object of the invention may also be obtained with another planetary gear arrangement, such as is shown in Fig. 3.

In this modification, a stationary main stud 40 is fixed in the wall of the gear casing 41, of which only a fraction is shown in Fig. 3. The driving shaft 42 is journalled at 43 in the casing wall 41 and carries at its inner end a drive cylinder 44 similar to the drive cylinder 4 in Fig. 1. The inner end of drive cylinder 44 is provided with a recess which carries bearing 45 by which the inner end of drive shaft 42 is journalled on the outer end of stud 40. On stud 40 is further mounted the hollow driven shaft 46 which is journalled at its left-hand end in a bearing 47 provided in housing 41, and at its right-hand end in bearing 48 mounted near the end of stud 40. Driven shaft 46 carries near the left-hand side of housing 41 a gear 49 from which the power is delivered. Near the right-hand end of driven shaft 46 is provided the sun wheel 50 which meshes with the teeth 52 of planetary rings 51, which are rotated by means of rollers 53 on studs 54 mounted on drive cylinder 44 in a manner similar to that described with reference to Fig. 1. Also similarly, planetary gear rings 51 are provided each with a peripheral bead 55 which rolls on driven shaft 46 so as to maintain the proper depth of mesh between the teeth 52 of the planetary rings 51 and the teeth of sun wheel 50.

Planetary rings 51 are surrounded by control gear 56 which is provided with teeth 57 at its inner periphery, which mesh with the teeth 52 of the planetary rings. An inner peripheral recess 58 is provided on the control gear 56 in which engage the beads 55 of the planetary rings. The free ends of studs 54 are held in a hub 59 loosely mounted on driven shaft 46. Control gear 56 is journalled at 60 on drive cylinder 44. No specific bearing, such as a ball bearing, is necessary at this point because the difference in speed between control gear 56 and drive cylinder 44 is very small most of the time, and when the entire gear system rotates as a unit there is no relative speed between these two elements.

So far as this arrangement has been described, it will be noted that when drive cylinder 44 by means of rollers 53 rotates the planetary rings 51 around sun wheel 50, control gear 56 will rotate at a speed higher than that of the driving shaft, assuming for the moment that the driven shaft 46 is standing still. In order to somewhat retard this excess of speed of control gear 56 and to cause a slow rotation of the driven shaft 46 in the direction of drive shaft 42, the following means are provided. Between the end of stud 40 and sun wheel 50 is mounted a jack gear 61 by means of an overrunning clutch 62 which is set in a direction, so that jack gear 61 can run freely in the same direction as drive shaft 42, but is prevented by the overrunning clutch from rotating in the opposite direction. Jack gear 61 is of a diameter smaller than that of sun wheel 50 and meshes with a gearing 63 on planetary rings 51, the pitch diameter of planetary gearing 63 being larger than the pitch diameter of gearing 52 on these rings. Gearing 63 of the planetary rings meshes with gearing 64 provided internally on control gear 56 and being of correspondingly larger pitch diameter than gearing 57 on control gear 56, which latter meshes with gearing 52 on the planetary rings. Thus both gearings on the planetary rings can operate simultaneously on control gear 56.

As mentioned before, the drive of planetary wheels 51 by rollers 53 would tend to rotate control gear 56 at a speed considerably higher than that of drive shaft 42 (depending upon the gear ratios between the sun wheel 50 and planetary wheels 51).

Owing to the difference in diameter between jack gear 61 and sun wheel 50, gear 61 would thereby have a tendency to run backward, which is prevented by the overrunning clutch and therefore the tendency of control gear 56 to run faster than driving shaft 42 causes the driven shaft 46 to run slowly forward at a speed commensurate with the difference in diameter between gears 50 and 61. This would be the lowest forward speed of the entire gear.

In order to cause the driven shaft to run faster as the speed of the driving shaft is increased, centrifugal means are provided which are similar to those described with reference to Fig. 1 and Fig. 2. As is shown in Fig. 3, the cylindrical portion of the control gear 56 is extended to the left as shown at 70, into the plane of the hub 71 fixed on the driven shaft 46. This hub is provided similar to the manner shown in Figs. 1 and 2 with four studs 72 on each of which is splined a ferrule 73 carrying at its upper end a roller 74, the rollers being held in engagement with the cam surface 76 by means of a compression spring 75 provided on each stud. The inner peripheral surface 76 of extension 70 has the shape of an oval cam, such as is shown at 29 in Fig. 2, with the result that when the driven shaft in Fig. 3 rotates slowly and control gear 56 runs relatively fast, the centrifugal force which throws rollers 74 outwardly is at first not strong enough to produce an appreciable drag on control gear 56 when the rollers roll up toward the high points on the cam surface. As the speed of the driving shaft increases, the centrifugal force increases and thereby also the drag on control gear 56, which thereby runs slower and slower with respect to the driving shaft, with the result that the speed of the driven shaft is increased more and more until when there is no difference in speed between control gear 56 and the driving shaft, the driven shaft will rotate at the same speed as the driving shaft, in other words, the entire gear system rotates as a unit without any part inside of the entire gear system moving relatively to any other part. So far as the steadiness of the drag on control gear 56 is concerned, the same advantages accrue in Fig. 3 as in the previously described Figs. 1 and 2, namely, the drag is practically continuous whatever its value may be for the moment. By means of the driving gear 49 mounted on driven shaft 46, the power is transmitted to the driven object, for instance a motor vehicle or the like.

While I have shown in all modifications four rollers cooperating with a two high-point cam surface, the number of cam rollers and correspondingly the number of cam high-points may be varied to suit any particular purpose to which the gear may be put, and I do not wish, therefore, to be limited to the particular number of cam points and cam rollers shown in the present disclosure.

I claim:

1. A planetary gear drive between a driving and a driven shaft, having a sun gear wheel on the driven shaft, planetary gear wheels suitably ratioed to and arranged to run in mesh with and about said sun wheel and means operated by said driving shaft for rotating said planetary wheels around said sun wheels, and a control gear wheel rotatably mounted on said driving shaft and in mesh with and surrounding said planetary gear wheels whereby said control gear normally tends to run at a speed higher than the driving shaft, determined by the planetary gear ratio, means for reducing the normal speed of said control gear a definite amount with respect to the driving shaft speed, whereby the driven shaft is rotated at a definite desired speed ratio with respect to the driving shaft, and an overrunning clutch operatively connected with said reducing means for preventing said control gear from running ahead of said reduced speed, but permitting it to run slower than said reduced speed, said control gear having an inner peripheral cam surface provided with at least one high and one low cam point, cam rollers radially slidingly mounted on said driven shaft within said cam surface and disposed to move radially outwardly and to bear against said cam surface by the centrifugal force developed by the rotation of said driven shaft and to produce a drag on said control gear when the rollers move toward a high point of the cam surface, by which drag the speed of the control gear with respect to the driving shaft is further reduced and the speed of the driven shaft is increased, said drag increasing with increasing speed of the driven shaft, due to the increased centrifugal force.

2. A planetary gear drive between a driving and a driven shaft, having a sun gear wheel on the driven shaft, planetary gear wheels suitably ratioed to and arranged to run in mesh with and about said sun wheel and means operated by said driving shaft for rotating said planetary wheels around said sun wheels, and a control gear wheel rotatably mounted on said driving shaft and in mesh with and surrounding said planetary gear wheels whereby said control gear normally tends to run at a speed higher than the driving shaft, determined by the planetary gear ratio, means for reducing the normal speed of said control gear a definite amount with respect to the driving shaft speed, whereby the driven shaft is rotated at a definite desired speed ratio with respect to the driving shaft, and an overrunning clutch operatively connected with said reducing means for preventing said control gear from running ahead of said reduced speed, but permitting it to run slower than said reduced speed, said control gear having an inner peripheral cam surface provided with at least one high and one low cam point, cam rollers radially slidingly mounted on said driven shaft within said cam surface and disposed to move radially outwardly and to bear against said cam surface by the centrifugal force developed by the rotation of said driven shaft and to produce a drag on said control gear when the rollers move toward a high point of the cam surface, by which drag the speed of the control gear with respect to the driving shaft is further reduced and the speed of the driven shaft is increased, said drag increasing with increasing speed of the driven shaft, due to the increased centrifugal force, and compression springs for holding said cam rollers in contact with said cam surface when the centrifugal force is insufficient to do so.

3. A planetary gear drive between a driving and a driven shaft, having a sun gear wheel on the driven shaft, planetary gear wheels suitably ratioed to and arranged to run in mesh with and about said sun wheel and means operated by said driving shaft for rotating said planetary wheels around said sun wheels, and a control gear wheel rotatably mounted on said driving shaft and in mesh with and surrounding said planetary gear wheels whereby said control gear normally tends to run at a speed higher than the driving shaft, determined by the planetary gear ratio, means for reducing the normal speed of said control gear a definite amount with respect to the driving shaft speed, whereby the driven shaft is rotated at a definite desired speed ratio with respect to the driving shaft, and an overrunning clutch operatively connected with said reducing means for preventing said control gear from running ahead of said reduced speed, but permitting it to run slower than said reduced speed, said control gear having an inner peripheral cam surface provided alternately with high and low cam points on its periphery, cam rollers radially slidingly mounted on said driven shaft within said cam surface and disposed to move radially outwardly and to bear against said cam surface by the centrifugal force developed by the rotation of said driven shaft and to produce a drag on said control gear when the rollers move toward a high point of the cam surface, by which drag the speed of the control gear with respect to the driving shaft is further reduced and the speed of the driven shaft is increased, said drag increasing with increasing speed of the driven shaft, due to the increased centrifugal force.

4. A planetary gear drive between a driving and a driven shaft, having a sun gear wheel on the driven shaft, planetary gear wheels suitably ratioed to and arranged to run in mesh with and about said sun wheel and means operated by said driving shaft for rotating said planetary wheels around said sun wheels, and a control gear wheel rotatably mounted on said driving shaft and in mesh with and surrounding said planetary gear wheels whereby said control gear normally tends to run at a speed higher than the driving shaft, determined by the planetary gear ratio, a plurality of jack gears between said control gear and said driving shaft, having a suitable ratio to reduce the speed of said control gear to run at a definite lower than normal speed ratio ahead of the driving shaft, whereby the driven shaft is rotated at a definite speed ratio to the driving shaft, and an overrunning clutch between said jack gears directed to permit said control gear to run below said reduced speed ratio but to lock it against running ahead of said reduced speed ratio, said control gear having an inner peripheral cam surface provided alternately with high and low cam points on its periphery, cam rollers radially slidingly mounted on said driven shaft within said cam surface and disposed to move radially outwardly and to bear against said cam surface by the centrifugal force developed by the rotation of said driven shaft and to produce a drag on said control gear when the rollers move toward a high point of the cam surface, by which drag the speed of the control gear with respect to the driving shaft is further reduced and the speed of the driven shaft is increased, said drag increasing with increasing speed of the driven shaft, due to the increased centrifugal force.

5. A planetary gear drive between a driving and a driven shaft, having a sun gear wheel on the driven shaft, planetary gear wheels suitably ratioed to and arranged to run in mesh with and about said sun wheel and means operated by said driving shaft for rotating said planetary wheels around said sun wheels, and a control gear wheel rotatably mounted on said driving shaft and in mesh with and surrounding said planetary gear wheels whereby said control gear normally tends to run at a speed higher than the driving shaft, determined by the planetary gear ratio, a plurality of jack gears operated by said driven shaft to rotate in a planetary path about the driving shaft axis and geared to said control gear and to said driving shaft, and having a suitable ratio to reduce the speed of said control gear to run at a definite, lower than normal speed ratio ahead of the driving shaft, whereby the driven shaft is rotated in the direction of the driving shaft at a definite speed ratio thereto and an overrunning clutch between said jack gears directed to permit said control gear to run below said reduced speed ratio, but to lock it against running ahead of said reduced speed ratio, said control gear having an inner peripheral cam surface provided alternately with high and low cam points on its periphery, cam rollers radially slidingly mounted on said driven shaft within said cam surface and disposed to move radially outwardly and to bear against said cam surface by the centrifugal force developed by the rotation of said driven shaft and to produce a drag on said control gear when the rollers move toward a high point of the cam surface, by which drag the speed of the control gear with respect to the driving shaft is further reduced and the speed of the driven shaft is increased, said drag increasing with increasing speed of the driven shaft, due to the increased centrifugal force.

6. A planetary gear drive between a driving and a driven shaft, having a stationary stud rotatably supporting said driven shaft, means for journaling the end of said driving shaft in the end of said stud, said driven shaft having a sun gear wheel fixed on it near the stud end, planetary gear wheels suitably ratioed to and arranged to run in mesh with and about said sun wheel and means operated by said driving shaft for rotating said planetary wheels about said sun wheel, a control gear wheel rotatably mounted on said driving shaft and in mesh with and surrounding said planetary wheels, whereby said control gear normally tends to run at a speed higher than the driving shaft, determined by the planetary gear ratio, a pinion having a pitch diameter smaller than that of said sun wheel and being disposed on the stud end between said sun wheel and the driving shaft and in mesh with said planetary wheels, and an overrunning clutch between said pinion and said stud directed to permit the control gear to run freely opposite to its normal direction and to prevent it from running ahead of the drive shaft except at a reduced normal speed determined by the ratio between said pinion and said planetary wheels, whereby through this positive retardation of the control gear the driven shaft is rotated at a definite speed ratio to the driving shaft, said control gear having an inner peripheral cam surface provided with at least one high and one low cam point, cam rollers radially slidingly mounted on said driven shaft within said cam surface and disposed to move radially outwardly and to bear against said cam surface by the centrifugal force developed by the rotation of said driven shaft and to produce a drag on said control gear when the rollers move toward a high point of the cam surface, by which drag the speed of the control gear with respect to the driving shaft is further reduced and the speed of the driven shaft is increased, said drag increasing with increasing speed of the driven shaft, due to the increased centrifugal force.

7. A plentary gear drive between a driving and a driven shaft, having a sun gear wheel fixed on the driven shaft, planetary gear wheels and an enclosing control gear wheel, all of said wheels geared together, and means operated by said driving shaft to rotate said planetary gears about the sun wheel to rotate said control gear ahead of the driving shaft, a free-wheeling gear operatively connected with the drive from said control gear to said driving shaft permitting free-wheeling of said control gear opposite to its normal rotation direction and preventing said gear from running ahead of the driving shaft faster than determined by said gear connection, said control gear having an inner peripheral cam surface provided with at least one high and one low cam point, cam rollers mounted on said driven shaft to rotate about it within said cam surface and disposed to move radially outwardly and to bear against said cam surface by the centrifugal force developed by the rotation of said driven shaft to produce a drag on said control gear directed opposite to the normal rotation direction of the gear when the rollers move toward a high point of the cam surface, by which drag the speed of the control gear with respect to the driving shaft is reduced and the speed of the driven shaft increased, said drag increasing with increasing speed of the driven shaft due to the increased centrifugal force.

8. A plentary gear drive between a driving and a driven shaft, having a sun gear wheel on the driven shaft, planetary ring gears suitably ratioed to and arranged to run in mesh with and about said sun wheel, and driving studs mounted on said driving shaft and extending through said ring gears, and rollers on said studs for rotating said rings around said sun wheels, and a collar freely rotatable on said driven shaft on the other side of said ring gears for supporting the free ends of said studs, and a control gear wheel rotatably mounted on said driving shaft and in mesh with and surrounding said planetary gear wheels whereby said control gear normally tends to run at a speed higher than the driving shaft, determined by the planetary gear ratio, means for reducing the normal speed of said control gear a definite amount with respect to the driving shaft speed, whereby the driven shaft is rotated at a definite desired speed ratio with respect to the driving shaft, and an overrunning clutch operatively connected with said reducing means for preventing said control gear from running ahead of said reduced speed, but permitting it to run slower than said reduced speed, said control gear having an inner peripheral cam surface provided with at least one high and one low cam point, cam rollers radially slidingly mounted on said driven shaft within said cam surface and disposed to move radially outwardly and to bear against said cam surface by the centrifugal force developed by the rotation of said driven shaft and to produce a drag on said control gear when the rollers move toward a high point of the cam surface, by which drag the speed of the control gear with respect to the driving shaft is further reduced and the speed of the driven shaft is increased, said drag increasing with increasing speed of the driven shaft, due to the increased centrifugal force.

AUGUST TIMMERMANN.